(12) United States Patent
Mao et al.

(10) Patent No.: US 8,775,789 B2
(45) Date of Patent: Jul. 8, 2014

(54) MULTI-MODE DATA CARD AND CALIBRATING METHOD THEREOF

(75) Inventors: Jianhua Mao, Shenzhen (CN); Xuebin Wu, Shenzhen (CN); Dingzhou Yang, Shenzhen (CN); Fading Yao, Shenzhen (CN)

(73) Assignee: ZTE Corporation, Shen zhen, Guangdong Province (CN)

( * ) Notice: Subject to any disclaimer, the term of this patent is extended or adjusted under 35 U.S.C. 154(b) by 53 days.

(21) Appl. No.: 13/388,334

(22) PCT Filed: Aug. 13, 2010

(86) PCT No.: PCT/CN2010/075984
§ 371 (c)(1),
(2), (4) Date: Feb. 1, 2012

(87) PCT Pub. No.: WO2011/127703
PCT Pub. Date: Oct. 20, 2011

(65) Prior Publication Data
US 2013/0031351 A1     Jan. 31, 2013

(30) Foreign Application Priority Data
Apr. 13, 2010   (CN) .......................... 2010 1 0150826

(51) Int. Cl.
| | | |
|---|---|---|
| *G06F 9/00* | (2006.01) | |
| *G06F 3/00* | (2006.01) | |
| *G06F 13/00* | (2006.01) | |
| *G06K 19/07* | (2006.01) | |

(52) U.S. Cl.
CPC ................................. *G06K 19/0722* (2013.01)
USPC .............................. 713/100; 710/11; 710/301

(58) Field of Classification Search
CPC ................................................... G06F 9/4411
USPC ........................................................ 713/100
See application file for complete search history.

(56) References Cited

U.S. PATENT DOCUMENTS

| | | | | |
|---|---|---|---|---|
| 6,168,077 | B1 * | 1/2001 | Gray et al. ..................... | 235/375 |
| 6,814,286 | B2 * | 11/2004 | Cheung ......................... | 235/440 |
| 6,883,715 | B1 * | 4/2005 | Fruhauf et al. ............... | 235/492 |
| 7,607,585 | B2 * | 10/2009 | Cho .............................. | 235/492 |
| 7,836,236 | B2 * | 11/2010 | Chou et al. ................... | 710/301 |
| 8,046,502 | B2 * | 10/2011 | Kim et al. ...................... | 710/11 |
| 8,244,293 | B2 * | 8/2012 | Kim ........................... | 455/550.1 |

FOREIGN PATENT DOCUMENTS

| | | | |
|---|---|---|---|
| CN | 1503957 | A | 6/2004 |
| CN | 1610302 | A | 4/2005 |

(Continued)

OTHER PUBLICATIONS

International Search Report for PCT/CN2010/075984 dated Dec. 16, 2010.

*Primary Examiner* — Suresh Suryawanshi
(74) *Attorney, Agent, or Firm* — Ling Wu; Stephen Yang; Ling and Yang Intellectual Property LLC (57) ABSTRACT

A multi-mode data card includes at least two mode modules, and also includes an external interface module and an interface control module. The external interface module connects to the interface control module. The external interface is configured to connect with computer for data interaction; the interface control module is equipped with at least two channels, and said at least two channels connects to said at least two mode modules respectively. The interface control module is configured to: when the multi-mode data card is calibrated, connect the external interface module with the channel corresponding to the mode module to be calibrated, and switch the multi-mode data card to the mode to be calibrated. A method for calibrating multi-mode data card is also provided in the present invention.

8 Claims, 3 Drawing Sheets

(56) References Cited

FOREIGN PATENT DOCUMENTS

| CN | 101378572 A | 3/2009 |
|---|---|---|
| DE | 102007034692 A1 | 2/2008 |
| EP | 1998455 A2 | 12/2008 |
| JP | 2001352670 A | 12/2001 |
| JP | 2002281132 A | 9/2002 |
| JP | 2010032402 A | 2/2010 |

* cited by examiner

MULTI-MODE DATA CARD AND CALIBRATING METHOD THEREOF

TECHNICAL FIELD

The present invention relates to communication field, and specifically, to a multi-mode data card and a calibrating method thereof.

BACKGROUND OF THE RELATED ART

With the popularity of the $3^{rd}$-Generation (3G) mobile communication technology and development of the $4^{th}$-Generation (4G) mobile communication technology, the data card products have developed from single-mode single-standard to multi-mode multi-standard.

The calibration of the single-mode data card is simple, and the time consumed by the calibration of the single-mode data card is less. In the prior art, since the multi-mode data card supports at least two standards, which is equivalent to calibrating at least two original single-mode data cards, the calibrating time is longer; and it is required to switch different instrumentations when calibrating different standards of the multi-mode data card, and the procedure of switching the instrumentation during the previous process of calibration will be repeated when calibrating the next multi-mode data card.

SUMMARY OF THE INVENTION

The reason for low efficiency of the calibrating method of existing multi-mode data card is: the pull/insert operation for each card during calibration causes time waste for calibrating; during the calibrating procedure of different standards of the single multi-mode data card and, after the completion of calibrating of single multi-mode data card and before the calibrating of the next multi-mode data card, there exists a process of switching instrumentation, wasting time and decreasing the efficiency of the calibration.

The present invention provides a method for calibrating multi-mode data card, to improve the efficiency of the calibrating of multi-mode data card.

On one hand, the present invention adopts the following technical scheme:

A multi-mode data card, comprising at least two mode modules, also comprising an external interface module and an interface control module, wherein:

the external interface module connects to the interface control module, and the external interface module is configured to: connect to a computer for data interaction;

the interface control module is equipped with at least two channels, and said at least two channels respectively connects to said at least two mode modules, and the interface control module is configured to: when the multi-mode data card is calibrated, connect the external interface module with the channel corresponding to the mode module to be calibrated, and switch the multi-mode data card to a mode to be calibrated.

In an embodiment of the above multi-mode data card, the interface control module also comprises a cascade interface sub-module; the cascade interface sub-module is configured to: when the multi-mode data card is in cascade, connect to the external interface module of another multi-mode data card.

In an embodiment of the above multi-mode data card, the multi-mode data card also comprises a power management module; wherein:

the power management module comprises a power channel control sub-module and a power conversion sub-module;

the power channel control sub-module connects to the external interface module and a power interface, and the power channel control sub-module is configured to: make an input power supply switch between an external power supply and a computer power supply;

the power conversion sub-module connects to the power channel control sub-module, and the power conversion sub-module is configured to: convert the input power supply to the power supply required by each part of the multi-mode data card.

In an embodiment of the above multi-mode data card, for the multi-mode data card which is powered from the computer through an external interface, an external interface power channel of the multi-mode data card connects to a cascade interface power channel, and the external interface power channel is shut off from the power interface, and the power interface is shut off from the cascade interface power channel; and when the input power supply is switched from the computer power supply to the external power supply after at least two multi-mode data cards of this type are cascaded, the power channel control sub-module shuts off the external interface power channel from the cascade interface power channel of first multi-mode data card, and connects the power interface with the cascade interface power channel of the first multi-mode data card; meanwhile, the external interface power channel, the power interface and the cascade interface power channel of the rest multi-mode data cards are connected.

In an embodiment of the above multi-mode data card, for the multi-mode data card which is powered from an external power supply through the power interface, the cascade interface power channel of the multi-mode data card connects to the power interface, and the external interface power channel is shut off from the cascade interface power channel, and the external interface power channel is shut off from the power interface; and when the input power supply is switched from the computer power supply to the external power supply after at least two multi-mode data cards of this type are cascaded, the power channel control sub-module keeps a connection way of the power interface and cascade interface power channel of the first multi-mode data card unchanged, and the external interface power channel, the power interface and the cascade interface power channel of the rest multi-mode data cards are connected.

On the other hand, the present invention also discloses a method for calibrating a multi-mode data card, comprising:

connecting an external interface module of the multi-mode data card to a computer;

connecting the external interface module with a channel corresponding to a mode module to be calibrated, switching the multi-mode data card to a mode to be calibrated; and calibrating the mode to be calibrated of the multi-mode data card.

In an embodiment of the above-mentioned method for multi-mode data card, when calibrating at least two multi-mode data cards which are cascaded, before the step of connecting the external interface module of the multi-mode data card to the computer, the method further comprises:

connecting a cascade interface sub-module of the multi-mode data card to the external interface module of another multi-mode data card, and cascading the above-mentioned multi-mode data cards.

In an embodiment of the above-mentioned method for calibrating the multi-mode data card, when calibrating at least two multi-mode data cards which are cascaded, after the step of connecting the external interface module with the channel corresponding to the mode module to be calibrated and switching the multi-mode data card to the mode to be calibrated, and before the step of calibrating the mode to be calibrated of the multi-mode data card, the method further comprises:

a power channel control sub-module making an input power supply switch from a computer power supply to an external power supply; and a power conversion sub-module converting the input power supply to a power supply required by each part of the multi-mode data card.

In an embodiment of the above-mentioned method for calibrating the multi-mode data card, for the multi-mode data card which is powered from computer through an external interface, an external interface power channel of the multi-mode data card connects to a cascade interface power channel, and the external interface power channel is shut off from a power interface, and the power interface is shut off from the cascade interface power channel;

the step of the power channel control sub-module making the input power supply switch from the computer power supply to the external power supply comprises:

the power channel control sub-module shutting off the external interface power channel from the cascade interface power channel of first multi-mode data card, and connecting the power interface with the cascade interface power channel of the first multi-mode data card; meanwhile, the external interface power channel, the power interface and the cascade interface power channel of rest multi-mode data cards are connected.

In an embodiment of the above-mentioned method for calibrating the multi-mode data card, for the multi-mode data card which is powered from the external power supply through the power interface, the cascade interface power channel of the multi-mode data card connects to the power interface, and the external interface power channel is shut off from the cascade interface power channel, and the external interface power channel is shut off from the power interface; and the step of the power channel control sub-module making the input power supply switch from the computer power supply to the external power supply comprises:

the power channel control sub-module keeps a connection way of the power interface and the cascade interface power channel of the first multi-mode data card unchanged, and the external interface power channel, the power interface and the cascade interface power channel of the rest multi-mode data cards are connected.

Compared to the prior art, the beneficial effect of the present invention lies in that:

the multi-mode data card of the present invention includes an external interface module, an interface control module and at least two mode modules, wherein: the interface control module is equipped with at least two channels, and said at least two channels respectively connects to said at least two mode modules, and when the multi-mode data card is calibrated, the interface control module connects the external interface module with the channel corresponding to the mode module to be calibrated, and switch the multi-mode data card to the mode to be calibrated. For the multi-mode data card of the present invention, multiple modes may be calibrated without pulling/inserting, saving the time for calibrating.

PREFERRED EMBODIMENTS OF THE PRESENT INVENTION

The present invention will be further described in detail in combination with drawings and specific embodiments below.

The present invention provides a multi-mode data card, including an external interface module, an interface control module and at least two mode modules, wherein, the external interface module connects to the interface control module, and the external interface module is configured to: connect to a computer for data interaction; the interface control module is equipped with at least two channels, and said at least two channels connects to said at least two mode modules respectively, and the interface control module is configured to: when the multi-mode data card is calibrated, connect the external interface module to the channel corresponding to the mode module to be calibrated, and switch the multi-mode data card to the mode to be calibrated.

Embodiment 1

Figure 1:
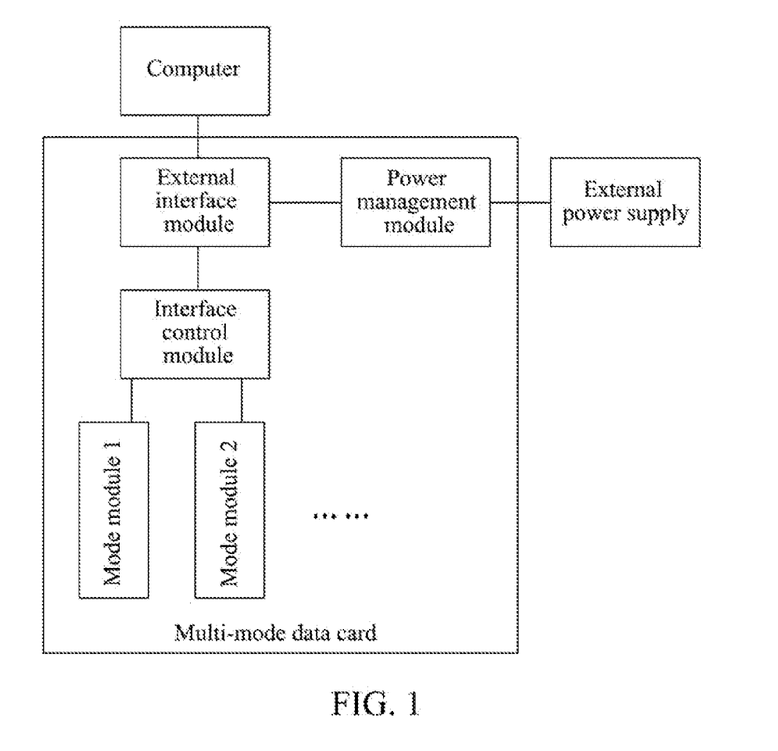
FIG. 1 exemplarily describes a system diagram of the present invention.

As shown in FIG. 1, the present invention discloses a multi-mode data card, including at least two mode modules, also including an external interface module and an interface control module, wherein the external interface module connects to the interface control module, and the external interface module is configured to: connect to a computer for data interaction; the interface control module is equipped with at least two channels, and said at least two channels connects to said at least two mode modules respectively, and the interface control module is configured to: when the multi-mode data card is calibrated, connect the external interface module to the channel corresponding to the mode module to be calibrated, and switch the multi-mode data card to the mode to be calibrated.

In the multi-mode data card of an embodiment of the present invention, the interface control module also includes a cascade interface sub-module, and the cascade interface sub-module is configured to: when the multi-mode data card is cascaded, connect to the external interface module of another multi-mode data card.

The multi-mode data card of an embodiment of the present invention also includes a power management module, and the power management module includes a power channel control sub-module and a power conversion sub-module, and the power channel control sub-module connects to the external interface module and a power interface, and the power channel control sub-module is configured to: make the input power supply switch between the external power supply and computer power supply, and the power conversion sub-module connects to the power channel control sub-module, and the power conversion sub-module is configured to: convert the input power supply to the power supply required by each part of the multi-mode data card.

In the multi-mode data card of an embodiment of the present invention, for an multi-mode data card powered from computer through external interface, the external interface power channel of the multi-mode data card connects to the cascade interface power channel, and the external interface power channel is shut off from the power interface, and the power interface is shut off from the cascade interface power channel; when at least two multi-mode data cards of this type are in cascade and then the input power supply is switched from a computer power supply to an external power supply, the power channel control sub-module shuts off the external interface power channel from the cascade interface power channel of the first multi-mode data card, and connects the power interface with the cascade interface power channel of the first multi-mode data card; meanwhile, the external interface power channel, the power interface and the cascade interface power channel of rest multi-mode data cards are connected.

In the multi-mode data card of an embodiment of the present invention, for an multi-mode data card powered from the external power supply through a power interface, the cascade interface power channel thereof connects to the power interface, and the external interface power channel is shut off from the cascade interface power channel, and the external interface power channel is shut off from the power interface; when at least two multi-mode data cards of this type are in cascade and the input power supply is switched from a computer power supply to an external power supply, the power channel control sub-module keeps a connection way of the power interface and the cascade interface power channel of the first multi-mode data card unchanged, and the external interface power channel, the power interface and the cascade interface power channel of the rest multi-mode data cards are connected.

Embodiment 2

Figure 2:
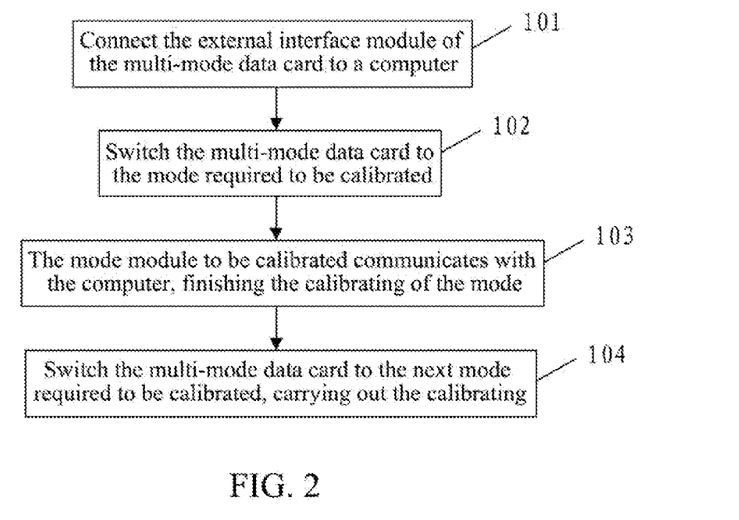
FIG. 2 exemplarily describes a flowchart of calibrating the single multi-mode data card of the present invention.

As shown in FIG. 2, when the mode calibration is carried out on the single multi-mode data card of one embodiment of the present invention, it includes the following steps:

Step 101, connect the external interface module of the multi-mode data card to a computer.

Step 102, switch the multi-mode data card to the mode required to be calibrated.

The multi-mode data card of one embodiment of the present invention includes an interface control module and at least two mode modules, in general, the channels corresponding to all the mode modules are connected to the interface control module, but during the same period of time there is only one mode module which could communicate with the computer, while the interface control module is configured to control which mode module the channel of connects to the external interface and communicates with the computer.

The interface control module includes a mode switching sub-module, there are two ways to realize the mode switching sub-module, one of which is the manual switching way, and the other is the automatic switching way.

The manual switching way adopts an external switch, and if the multi-mode data card has N modes, then N+1 calibration gears are set, wherein the N calibration gears correspond to N modes, and the rest one gear represents a normal use state.

When the calibration gear is manually adjusted to gear M, the channel of M mode module connects to the external interface, and may carry out data communication with the computer, and the multi-mode data card presents M mode.

The mode of the multi-mode data card is switched by the manual switching way using the external switch, without need for electrical control, with simple structure, and it is convenient to control, with low costs.

The automatic switching way adopts a group of data switch channels, and each data switch channel connects to one mode module, and when the mode of the multi-mode data card is switched, the mode module is required to connect to the data switch channel of the external interface, achieving the purpose of switching mode.

Adopting the automatic switching way, the mode switching can be carried out uniformly and quickly when multiple multi-mode data cards are cascaded, which has a high efficiency.

Step 103, the mode module required to be calibrated communicates with the computer, finishing the download and upload of data and the calibrating of the mode.

Step 104, switch the multi-mode data card to the next mode required to be calibrated, and continue the calibration.

The method of the present invention adopts the mode of manual or automatic switching multi-mode data card, and then calibrating the multi-mode data card, without need to pull/insert multi-mode data card, saving the time for calibration.

Embodiment 3

Figure 3:
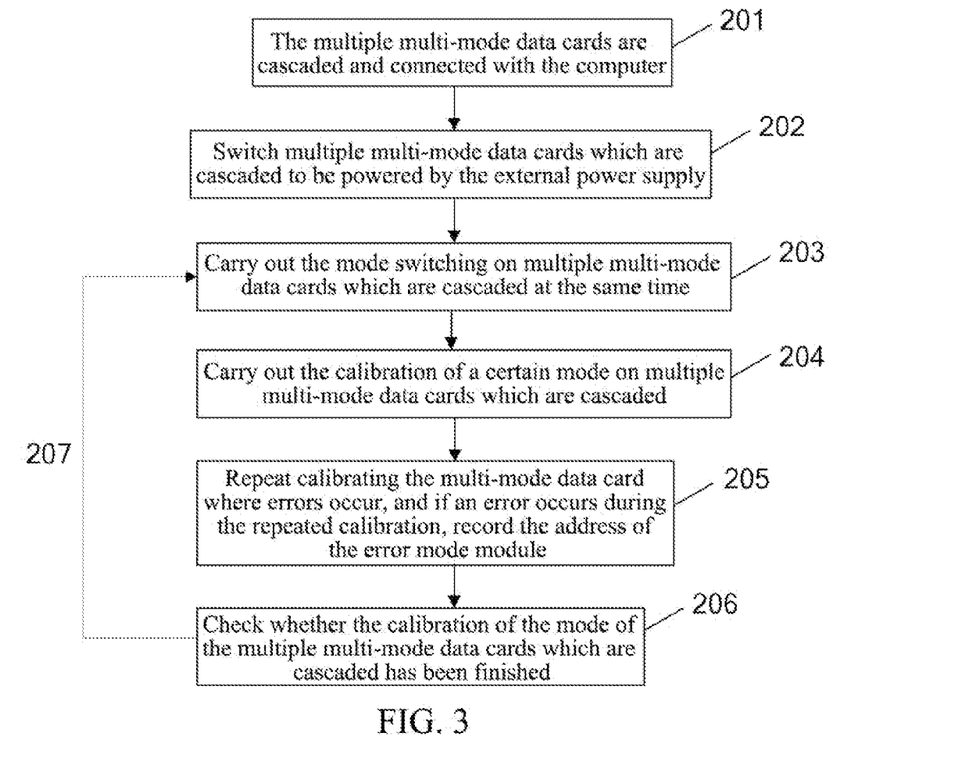
FIG. 3 exemplarily describes a flowchart of calibrating during the cascading of multiple multi-mode data cards of the present invention.

As shown in FIG. 3, in an embodiment of the present invention, when the mode calibration is carried out on multiple multi-mode data cards at the same time, the method includes the following steps:

Step 201, the multiple multi-mode data cards are cascaded and connected to the computer.

Connect the cascade interface of one multi-mode data card with the external interface of another multi-mode data card in sequence, and connect the rest one idle external interface with the computer.

In this embodiment, the multi-mode data card of which the external interface connects to the computer is called the first multi-mode data card.

The cascade of the multi-mode data cards may be a direct connection, or may be a connection via adapter cable.

The cascade interface may be connected directly to the interface control module, or connected to the interface control module by using the data switching channel in the switching sub-module.

The switching sub-module of the multi-mode data card for which the cascade calibration can be carried out usually adopts the automatic switching way, in general, the multi-mode data card only presents a certain mode, that is to say, only one of the data switching channels of the switching sub-module is in connection state, and the rest data switching channels are in unconnection state, and connect one of the unconnected data switching channels to the cascade module, then the cascade of the multi-mode data card may be realized.

The cascade module connects directly to the interface control module, which is a simple structure; the cascade module connects to the interface control module by the data switching channel in the switching sub-module, thereby saving the number of the data connection channels and decreasing the costs.

The cascade interface and the external interface both include a data channel and a power channel, and the connection of said cascade interface and the external interface refers to the connection of data channels.

Step 202, switch multiple multi-mode data cards which are cascaded to be powered by an external power supply.

When the cascade of multiple multi-mode data cards is carried out at the same time, if powered from a computer through an external interface, the power supply may be insufficient, or the interface of the computer may be damaged due to the excessive power supply, therefore an external power supply is generally adopted when the cascade of multiple multi-mode data cards is calibrated.

The multi-mode data card is equipped with one power interface which may connect to the external power supply.

Figure 4:
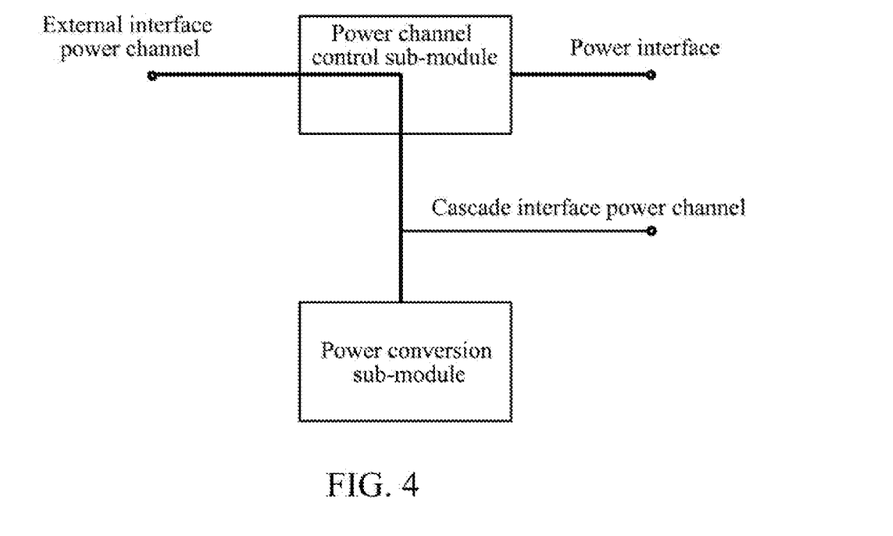
FIG. 4 exemplarily describes a power supply schematic diagram of the multi-mode data card powered through an external interface of the present invention.

As shown in FIG. 4, the power management module includes a power channel control sub-module and a power conversion sub-module.

The power channel control sub-module connects to the power channel of the external interface, and meanwhile connects to the power interface, and connects to the cascade interface power channel. The power channel control sub-module is one or a group of switches, and the switch may shut off/connect the power interface from/with the cascade interface power channel, the external interface power channel from/with the cascade interface power channel, the external interface power channel from/with the power interface.

As shown in FIG. 4, for the multi-mode data card which is generally powered from the computer through the external interface, the external interface power channel thereof connects to the cascade interface power channel, and the external interface power channel is shut off from the power interface, and the power interface is shut off from the cascade interface power channel; when the power supply is switched after multiple multi-mode data cards of this type are cascaded; the power channel control sub-module shuts off the external interface power channel from the cascade interface power channel of the first multi-mode data card; and connects the power interface of the first multi-mode data card with the cascade interface power channel; meanwhile, the external interface power channel, the power interface and the cascade interface power channel of the rest multi-mode data cards are connected.

Figure 5:
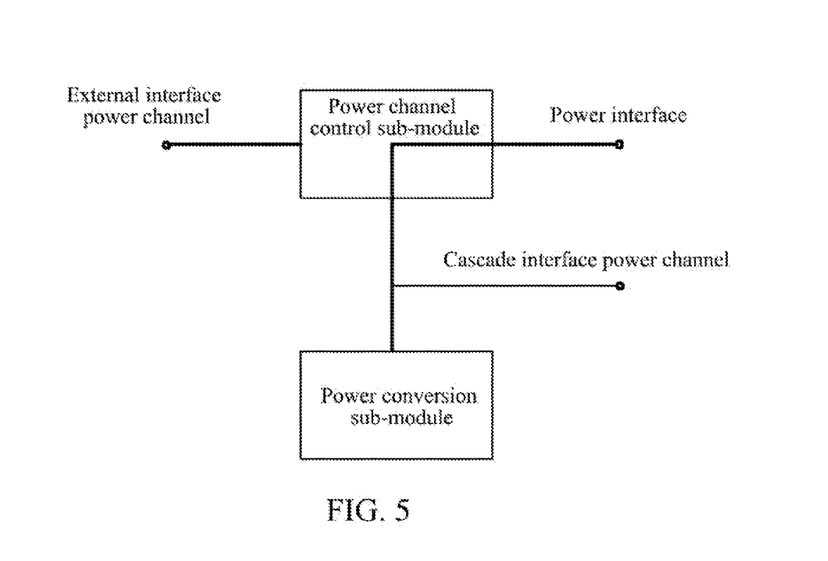
FIG. 5 exemplarily describes a power supply schematic diagram of the multi-mode data card powered through a power interface of the present invention.

As shown in FIG. 5, for the multi-mode data card which is generally powered from an external power supply through a power interface, the cascade interface power channel thereof connects to the power interface, and the external interface power channel is shut of from the cascade interface power channel, and the external interface power channel is shut off from the power interface; when the power supply is switched after multiple multi-mode data cards of this type are cascaded, the power channel control sub-module keeps the connection way of the power interface and the cascade interface power channel of the first multi-mode data card unchanged, and the external interface power channel, the power interface and the cascade interface power channel of the rest multi-mode data cards are connected.

Figure 6:
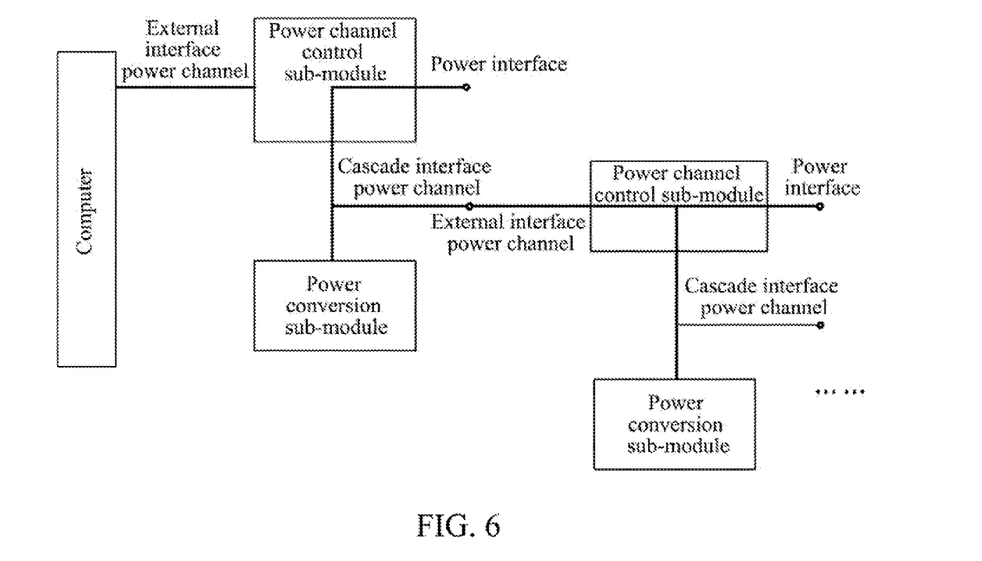
FIG. 6 exemplarily describes a power supply schematic diagram during the cascading of the present invention.

The connection of the above two cascade systems after switching the power supply is shown in FIG. 6, and the power conversion sub-modules of all the multi-mode data cards are connected and connected to all of the power interfaces, therefore when the power interface of any one of multi-mode data cards is connected with an external power supply, all of the multi-mode data cards may be powered by an external power supply.

The above power switching ways may be applied in the hybrid cascade with two different power supply ways, which needs to be processed respectively at this time, however the connection after the power supply is switched is still shown in FIG. 6.

The power conversion sub-module is composed of direct current to direct current (DC-DC) power converter and low dropout regulator (LDO), and the power conversion sub-module is configured to: convert the input power supply to the power supply required by each part of the multi-mode data card, which is provided for the multi-mode data card for use.

When multiple multi-mode data cards are cascaded, power is provided by using an external power supply through a power interface, and the power supply is insufficient, and meanwhile the computer interface is also protected.

Step 203, carry out the mode switching on multiple multi-mode data cards which are cascaded at the same time.

Step 204, carry out the calibration of a certain mode on multiple multi-mode data cards which are cascaded at the same time.

When the multiple multi-mode data cards which are cascaded are calibrated, the computer usually carries out identification according to the address of the data switch channel, and in general, the calibration is carried out in an order from the first multi-mode data card to the last multi-mode data card which is cascaded.

Step 205, if an error occurs during the calibration of a certain multi-mode data card, re-calibrate the multi-mode data card; if the number of repeated calibration exceeds a certain number, stop calibrating and record the address of the error mode module of the multi-mode data card, so as to find out the multi-mode data card where the module with error is located during the subsequent processing.

Step 206, check whether the calibration of the mode of multiple multi-mode data cards which are cascaded is finished.

In general, the computer checks the calibration state according to the address of the data switch channel where all the modules with the same mode are located, including whether it is calibrated, whether an error occurs during the process of calibration, and whether the calibration is finished and so on.

Step 207, repeat the step 203 to 206, until all the modes of the multi-mode data cards have been calibrated.

The multi-mode data card of the present invention includes an external interface module, an interface control module and at least two mode modules, wherein the interface control module is equipped with at least two channels, and said at least two channels connect to at least two mode modules respectively, and when the multi-mode data card is calibrated, the interface control module connects the external interface module with the channel corresponding to the mode module to be calibrated, and switches the multi-mode data card to the mode to be calibrated.

The above content is the further detailed description made to the present invention in combination with the specific preferred embodiments, which is however examples for ease of understanding, but should not be considered as a limit to the specific embodiments of the present invention. For the people skilled in the field of the present invention, various possible equivalent changes or replacements can be made without departing from the idea of the present invention, which should fall into the protection scope of the present invention.

INDUSTRIAL APPLICABILITY

The calibration can be carried out for the multi-mode data card of the present invention without pulling/inserting, saving the time for calibration. Additionally, the multi-mode data card of the present invention also provides a cascade interface which is able to cascade multiple multi-mode data cards, and multiple multi-mode data cards can be calibrated at the same time, avoiding pulling/inserting the data card frequently and switching the instrumentation, thereby saving the calibrating time greatly. Additionally, the present invention also provides a power switching function, by way of introducing an external power supply by using a power interface during the calibrating process, the problem of electricity shortage in the calibrating process and the damage to the computer interface are avoided.

What is claimed is:

1. A multi-mode data card, comprising at least two mode modules, further comprising an external interface module and an interface control module, wherein:

the external interface module connects to the interface control module, and the external interface module is configured to: connect to a computer for data interaction;

the interface control module is equipped with at least two channels, and said at least two channels respectively connects to said at least two mode modules, and the interface control module is configured to: when the multi-mode data card is calibrated, connect the external interface module with the channel corresponding to the mode module to be calibrated, and switch the multi-mode data card to a mode to be calibrated;

wherein, the interface control module further comprises a cascade interface sub-module; the cascade interface sub-module is configured to: when the multi-mode data card is in cascade, connect to the external interface module of another multi-mode data card.

2. The multi-mode data card according to claim 1, further comprising a power management module; wherein:

the power management module comprises a power channel control sub-module and a power conversion sub-module;

the power channel control sub-module connects to the external interface module and a power interface, and the power channel control sub-module is configured to: make an input power supply switch between an external power supply and a computer power supply;

the power conversion sub-module connects to the power channel control sub-module, and the power conversion sub-module is configured to: convert the input power supply to a power supply required by each part of the multi-mode data card.

3. The multi-mode data card according to claim 2, wherein:

for the multi-mode data card which is powered from the computer through an external interface, an external interface power channel of the multi-mode data card connects to a cascade interface power channel, and the external interface power channel is shut off from the power interface, and the power interface is shut off from the cascade interface power channel; and when the input power supply is switched from the computer power supply to the external power supply after at least two multi-mode data cards of this type are cascaded, the power channel control sub-module shuts off the external interface power channel from the cascade interface power channel of first multi-mode data card, and connects the power interface with the cascade interface power channel of the first multi-mode data card; meanwhile, the external interface power channel, the power interface and the cascade interface power channel of rest multi-mode data cards are connected.

4. The multi-mode data card according to claim 2, wherein:

for the multi-mode data card which is powered from the external power supply through the power interface, a cascade interface power channel of the multi-mode data card connects to the power interface, and an external interface power channel is shut off from the cascade interface power channel, and the external interface power channel is shut off from the power interface; and when the input power supply is switched from the computer power supply to the external power supply after at least two multi-mode data cards of this type are cascaded, the power channel control sub-module keeps a connection way of the power interface and cascade interface power channel of first multi-mode data card unchanged, and the external interface power channel, the power interface and the cascade interface power channel of rest multi-mode data cards are connected.

5. A method for calibrating a multi-mode data card, comprising:

connecting an external interface module of the multi-mode data card to a computer;

connecting the external interface module with a channel corresponding to a mode module to be calibrated, switching the multi-mode data card to a mode to be calibrated; and calibrating the mode to be calibrated of the multi-mode data card;

wherein, when calibrating at least two multi-mode data cards which are cascaded, before the step of connecting the external interface module of the multi-mode data card to the computer, the method further comprises:

connecting a cascade interface sub-module of the multi-mode data card to the external interface module of another multi-mode data card, and cascading the above multi-mode data cards.

6. The method according to claim 5, wherein, when calibrating at least two multi-mode data cards, after the step of connecting the external interface module with the channel corresponding to the mode module to be calibrated and switching the multi-mode data card to the mode to be calibrated, and before the step of calibrating the mode to be calibrated of the multi-mode data card, the method further comprises:

a power channel control sub-module making an input power supply switch from a computer power supply to an external power supply; and a power conversion sub-module converting the input power supply to a power supply required by each part of the multi-mode data card.

7. The method according to claim 6, wherein, for the multi-mode data card which is powered from computer through an external interface, an external interface power channel of the multi-mode data card connects to a cascade interface power channel, and the external interface power channel is shut off from a power interface, and the power interface is shut off from the cascade interface power channel;

the step of the power channel control sub-module making the input power supply switch from the computer power supply to the external power supply comprises:

the power channel control sub-module shutting off the external interface power channel from the cascade interface power channel of first multi-mode data card, and connecting the power interface with the cascade interface power channel of the first multi-mode data card; meanwhile, the external interface power channel, the power interface and the cascade interface power channel of rest multi-mode data cards being connected.

8. The method according to claim 6, wherein,
for the multi-mode data card which is powered from the external power supply through the power interface, a cascade interface power channel of the multi-mode data card connects to the power interface, and an external interface power channel is shut off from the cascade interface power channel, and the external interface power channel is shut off from the power interface; and the step of the power channel control sub-module making the input power supply switch from the computer power supply to the external power supply comprises:

the power channel control sub-module keeping a connection way of the power interface and the cascade interface power channel of first multi-mode data card unchanged, and the external interface power channel, the power interface and the cascade interface power channel of rest multi-mode data cards being connected.

* * * * *